(12) United States Patent
Brautaset et al.

(10) Patent No.: US 9,919,780 B2
(45) Date of Patent: Mar. 20, 2018

(54) PROPULSION SYSTEM FOR VESSELS

(71) Applicants: Scana Volda AS, Volda (NO); Inpower AS, Molde (NO)

(72) Inventors: Henning Brautaset, Ørsta (NO); Roald Håvik, Austefjord (NO)

(73) Assignees: Scana Volda AS, Volda (NO); Inpower AS, Molde (NO)

( * ) Notice: Subject to any disclaimer, the term of this patent is extended or adjusted under 35 U.S.C. 154(b) by 375 days.

(21) Appl. No.: 14/436,243

(22) PCT Filed: Oct. 18, 2013

(86) PCT No.: PCT/IB2013/059441
§ 371 (c)(1),
(2) Date: Apr. 16, 2015

(87) PCT Pub. No.: WO2014/060994
PCT Pub. Date: Apr. 24, 2014

(65) Prior Publication Data
US 2015/0274271 A1 Oct. 1, 2015

(30) Foreign Application Priority Data
Oct. 18, 2012 (NO) .................................. 20121215

(51) Int. Cl.
*B63H 3/08* (2006.01)
*B63H 21/17* (2006.01)
(Continued)

(52) U.S. Cl.
CPC ............. *B63H 3/082* (2013.01); *B63H 21/17* (2013.01); *B63H 21/386* (2013.01); *B63H 23/06* (2013.01);
(Continued)

(58) Field of Classification Search
CPC .................... B63H 21/17; B63H 23/24; B63H 2005/1258; B63H 3/08; B63H 3/081;
(Continued)

(56) References Cited

U.S. PATENT DOCUMENTS 2,714,866 A * 8/1955 Pleuger .................. B63H 5/125
114/166
3,778,187 A 12/1973 Wennberg
(Continued)

FOREIGN PATENT DOCUMENTS

| DE | 10 2008 018420 A1 | 10/2009 |
|----|-------------------|---------|
| DE | 10 2009 002265 A1 | 10/2010 |
| EP | 1466826 B1 | 10/2004 |
| JP | 2002-145189 A | 5/2002 |
| WO | 2006048691 A1 | 5/2006 |

OTHER PUBLICATIONS

International Search Report issued in PCT/IB2013/059441 dated Mar. 25, 2014 (2 pages).
(Continued)

Primary Examiner — Ajay Vasudeva
(74) Attorney, Agent, or Firm — Osha Liang LLP

(57) ABSTRACT

A propulsion system includes at least one permanent magnet motor, the magnet motor including an outer housing structure. In the housing structure, a stator and a rotor are arranged in such a way that a gap is formed between the stator and rotor, the stator being fixedly connected to the housing structure, while the rotor is connected to a motor shaft extending through the housing structure. A plurality of coils/windings are arranged around an inner circumference of the stator, while a plurality of permanent magnets are arranged around an outer circumference of the rotor. Through a coupling, the motor shaft is connected to a propeller shaft including a propeller. A thrust bearing and a propeller pitch control system are integrated into the permanent magnet motor.

15 Claims, 5 Drawing Sheets

(51) Int. Cl.
- *B63H 23/24* (2006.01)
- *H02K 7/08* (2006.01)
- *B63H 21/38* (2006.01)
- *B63H 23/06* (2006.01)
- *H02K 7/00* (2006.01)

(52) U.S. Cl.
CPC ............. *B63H 23/24* (2013.01); *H02K 7/003* (2013.01); *H02K 7/08* (2013.01); *B63H 2003/088* (2013.01)

(58) Field of Classification Search
CPC ............. B63H 3/082; B63H 2003/084; B63H 2003/088; B63H 21/386; B63H 23/06; H02K 7/08; H02K 7/003
See application file for complete search history.

(56) References Cited

U.S. PATENT DOCUMENTS

| | | | |
|---|---|---|---|
| 5,403,216 A * | 4/1995 | Salmi ................ | B63H 5/125 440/53 |
| 6,231,407 B1 * | 5/2001 | Hein ................. | B63H 5/07 440/6 |
| 2004/0063363 A1 * | 4/2004 | Drefs ................ | B63H 5/08 440/6 |

OTHER PUBLICATIONS

International Preliminary Report on Patentability from PCT/IB2013/059441 dated Nov. 10, 2014 (12 pages).
Norwegian Search Report in corresponding Norwegian Application No. 20121215 dated May 16, 2013 (2 pages).

* cited by examiner

PROPULSION SYSTEM FOR VESSELS

One or more embodiments of the present invention relates to a propulsion system for vessels, which propulsion system comprises one or more electric motors, in particular electric permanent magnet motors. More specifically, one or more embodiments of the present invention relates to an electric permanent magnet motor where a thrust bearing and an oil distributor unit in a propeller pitch control system are integrated into the electric (permanent magnet) motor itself.

Different systems have been proposed for the propulsion of vessels, in which one or more rotating propellers are arranged below the vessel's waterline. Typically, such propellers have been driven by diesel power, steam turbines or electric motors arranged in the hull of the vessel. A propeller shaft will then run through the hull of the vessel to the propeller(s) that is/are mounted outside the hull. The propeller shafts in such systems will however be relatively long, which means that this may be disadvantageous in relation to vibrations and generation of noise in the system. Furthermore, such long shaft systems pose challenges as regards arrangement (poor use of space), the number of bearings increases (wear parts) etc.

One or more embodiments provide a propulsion system for vessels, which reduces or eliminates one or more drawbacks of the prior art.

One or more embodiments provide a propulsion system for a vessel, where a thrust bearing and an oil distributor unit in a propeller pitch control system are integrated into an electric motor, in particular an electric permanent magnet motor, whereby the thrust forces of the propeller are transferred directly to the base of the electric permanent magnet motor and a shorter overall length of the propulsion system is thus obtained.

These objects are achieved in accordance with the invention by the features that are disclosed in the following independent claim, with additional features of the invention set forth in the dependent claims and the description below.

One or more embodiments relate to a propulsion system for vessels, the propulsion system including one or more permanent magnet motors, which permanent magnet motors further comprise a housing structure and at least one rotor and stator arranged therein, the stator(s) being fixedly connected to the housing structure, whilst the rotor(s) is/are connected to a motor shaft extending through the housing structure. The stator in such a permanent magnet motor will then comprise a plurality of coils/windings that are passed through axial grooves around an inner circumference of the stator, whilst the rotor comprises a plurality of permanent magnets that are suitably arranged around the outer circumference of the rotor. The motor shaft extending through the housing structure will, through a coupling, be further connected to a propeller shaft comprising a controllable pitch propeller. A thrust bearing and an oil distributor unit in a propeller pitch control system are further integrated into the housing structure of the permanent magnet motor.

It should however be understood that also other types of electric motors can be used in the propulsion system according to the present invention.

In one or more embodiments of the present invention, the electric permanent magnet motor comprises two rotors which are each detachably connected to a rotor web or to the motor shaft extending through the housing structure, so as to provide a redundancy in the propulsion system. If one of the rotors fails or needs maintenance/repair, this rotor can be disconnected from the rotor web/motor shaft, whereby the remaining rotor will be used for further operation of the propulsion system.

The propeller in the propulsion system according to one or more embodiments of the present invention is configured with controllable pitch propeller blades, such that the blades of the propeller can be adjusted in relation to the varying conditions encountered by the propeller during use, thereby obtaining optimal utilisation of power.

In order to be able to adjust the controllable pitch propeller, the propulsion system according to one or more embodiments of the present invention also includes a propeller pitch control system, which propeller pitch control system includes an oil distributor unit and a piping system. The oil distributor unit will then be suitably integrated into the housing structure itself, lying wholly or partly within the housing structure. The oil distributor unit will furthermore be connected to the motor shaft extending through the housing structure to the piping system, so as to be in fluid communication with the controllable pitch propeller. The propeller pitch control system will also be capable of indicating the position of the propeller blades.

The motor shaft extending through the housing structure and the propeller shaft will then be configured with an internal bore which extends along the whole length of the motor shaft and the propeller shaft, such that the piping system in the propeller pitch control system can be passed through the internal bore in the motor shaft and the propeller shaft, so as to connect the oil distributor unit to the propeller hub.

The propeller hub will then internally be configured with a closed volume containing a fluid, a movable piston being arranged in the closed volume, such that a first and a second chamber are formed in the closed volume, whereby the movement of the piston is used to adjust the blades of the propeller.

In one or more embodiments, the piping system includes, for example, two pipes, where one of the pipes may be arranged in the other pipe, so as to form two courses. The one pipe that runs from the oil distributor unit and through the bore in the motor shaft and the propeller shaft will then be in fluid communication with the first chamber in the closed volume in the propeller hub, whilst the other pipe that runs from the oil distributor unit will be in fluid communication with the second chamber in the closed volume in the propeller hub. Since the oil distributor unit of the propeller pitch control system is further connected to a control unit and one or more pump units, which control unit and pump unit(s) are arranged external to the electric permanent magnet motor, an amount of fluid can be delivered through the oil distributor unit and the piping system to either the first or the second chamber in the closed volume. This will mean that the movable piston will move towards the first chamber (if fluid is supplied to the second chamber) and towards the second chamber (if fluid is supplied to the first chamber), thereby causing the pitch of the propeller blades to be changed (reduced or increased). The propeller blades will then, through a crank mechanism, be connected to the piston in such a way that the pitch of the propeller blades will be increased when the piston is moved towards the first chamber and reduced when the piston is moved towards the second chamber in the closed volume in the propeller hub.

It should be understood that the pipes in the piping system also may be arranged separately, lying adjacent to one another or one above the other.

In one or more embodiments, the propeller pitch control system may be so arranged that the oil distributor unit is connected through the piping system to a closed volume which is formed in a shaft or flange coupling, which shaft or flange coupling may, for example, be the coupling between the motor shaft extending through the housing structure and the propeller shaft. Arranged in the closed volume in the shaft or flange coupling will be a piston, one side of this piston being connected to a piston rod. The piston rod will then extend from the flange or shaft coupling and on through the bore in the propeller shaft, so as to be connected to a crank mechanism in the propeller hub. The piping system in this embodiment can be the same as above, whereby one of the pipes will be in fluid communication with the first chamber in the closed volume in the flange or shaft coupling, whilst the other pipe will be in fluid communication with the second chamber in the flange or shaft coupling. By supplying a fluid to one or the other chamber, it will be possible to change the position of the piston in the closed volume. As the piston is connected to the piston rod, the piston rod will follow the movement of the piston, whereby the movement is transmitted to a crank mechanism in the propeller hub, to which crank mechanism the propeller blades are also connected.

It should be understood that the closed volume may also be arranged in the permanent magnet motor itself, for example, in a forward end thereof.

Since the piping system is connected to the piston in the propeller hub or to the piston in the shaft or flange coupling, the piping system will follow the movement of the piston. As a result, the axial position of the piston and the axial position of the piping system will correspond, and will be an expression of the pitch of the propeller blades. The axial position of the piping system close to the oil distributor unit will then be usable to indicate the pitch of the propeller blades.

The motor shaft extending through the housing structure may be radially supported internally in the housing structure by at least one radial bearing, preferably two axial bearings. Where two radial bearings are used, a radial bearing will be arranged on either side of the rotor web, which rotor web is fixedly or detachably connected to the motor shaft extending through the housing structure. It should be understood, however, that the motor shaft extending through the housing structure may also be supported external to the housing structure.

The motor shaft extending through the housing structure may, for example, at an aft end be configured with a flange, which flange is supported in a plurality of axial bearings (thrust bearings) within the housing structure. The flange may either be a separate flange that is suitably connected to a motor shaft, or it may be made as an integral part of the motor shaft. The axial bearings are comprised of so-called thrust discs that are divided into circle segments and then arranged in a bearing housing in or integral with the electric permanent magnet motor. The axial bearings will then be arranged on each side of the motor shaft flange. A side of the axial bearings facing the motor shaft flange will expediently be coated with a sliding material. Through this arrangement, thrust forces in the propulsion system, causing the propeller shaft and the motor shaft to move in an axial direction, will be capable of being taken up efficiently by the axial bearings.

It should however be understood that the axial bearings may also be other types of bearings, for example, rolling bearings, which may be ball bearings, roller bearings, needle bearings etc.

Furthermore, it should be understood that the thrust bearing can be arranged in a forward end of the electric permanent magnet motor.

The motor shaft and the propeller shaft may be connected to each other through a flange coupling, sleeve coupling or the like.

In one or more embodiments, the permanent magnet motor includes an additional rotor, where the rotors are detachable relative to each other and the rotor web or motor shaft extending through the housing structure.

The housing structure includes two end covers that may be suitably connected to the housing structure so as to form a closed electric permanent magnet motor. If the end covers are, for example, connected to the housing structure through a screw or bolt connection, this will also facilitate maintenance and repair of the electric permanent magnet motor.

Further structural embodiments and advantages of the present invention will be seen clearly from the following detailed description, the attached drawings and the claims below.

The invention will now be described with reference to the attached figures, wherein.

Figure 1:
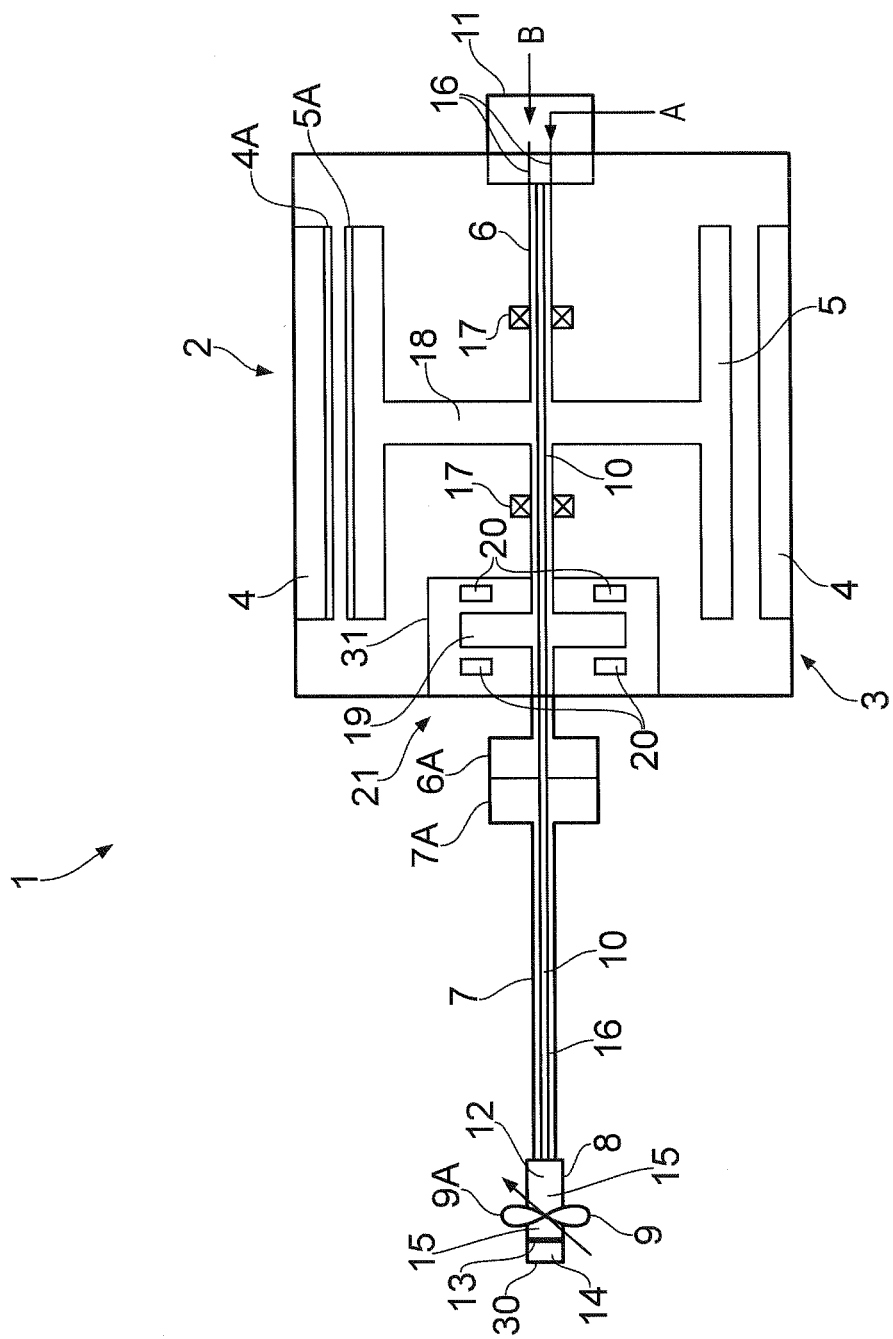
FIG. 1 shows an embodiment of a propulsion system for a vessel according to the present invention.

FIG. 1 shows an embodiment of a propulsion system 1 for a vessel according to the present invention, the propulsion system 1 including a permanent magnet motor 2 having an outer housing structure 3, in which housing structure 3 a stator 4 and a rotor 5 are arranged. The stator 4 will be suitably fixedly connected to the housing structure 3, whilst the rotor 5 will be fixedly or detachably connected to a motor shaft 6 extending through the housing structure 3. A plurality of coils/windings 4A will be arranged around the inner circumference of the stator 4, whilst a plurality of permanent magnets 5A will similarly be arranged around the outer circumference of the rotor 5.

The motor shaft 6 extending through the housing structure 3 is, at an end that extends beyond the housing structure 3, configured with a flange coupling 6A, so as to be capable of connection to a propeller shaft 7 configured with a corresponding flange coupling 7A. The propeller shaft 7 is at an opposite end to the flange coupling 7A connected to a propeller hub 8 and a controllable pitch propeller 9. The motor shaft 6 extending through the housing structure 3 and the propeller shaft 7 are configured with an internal bore 10 extending along the whole length of the motor shaft 6 and the propeller shaft 7.

It should however be understood that also other types of couplings can be used to connect the shaft 6 and the propeller shaft 7, for example, sleeve couplings or the like.

The propeller hub 8 is configured with an inner bore 12 that defines a closed volume 30, which closed volume 30 is divided by a movable piston 13, in such a way as to form a first chamber 14 and a second chamber 15 in the closed volume 30. The first and the second chamber 14, 15 are further configured with connecting means (not shown) so as to be capable of connection to a piping system 16. The structure and function of the piping system 16 will be described in more detail with reference to FIG. 4.

An oil distributor unit 11 is integrated into the housing structure 3 by being suitably connected to the motor shaft 6 extending through the housing structure 3. The oil distributor unit 11 will then be connected to the piping system 16, which piping system 16 will run through the internal bore 10 extending through the length of the motor shaft 6 and the propeller shaft 7, so as to be capable of connection to its respective first and second chamber 14, 15 in the closed volume 30.

By connecting the oil distributor unit 11 to one or more pump units (not shown) and a control unit (not shown), it will be possible, through the piping system 16, to supply a fluid to the first or second chamber 14, 15, which will cause the movable piston 13 to move towards the chamber 14, 15 that is not supplied with fluid, and at the same time is drained out of the second or first chamber 15, 14 through the piping system 16. This movement of the piston 13 will cause the propeller 9 blades 9A to change their position (the propeller pitch is changed). The propeller 9 blades 9A will then be connected to the piston 13 via a crank mechanism (not shown) in such a way that the movement of the piston 13 provides a twisting of the propeller blades 9A.

A person of skill in the art will know how this is to be done, and therefore it is not further discussed herein.

The oil distributor unit 11 and the piping system 16 will thus constitute the propeller pitch control system in the propulsion system according to the present invention.

The motor shaft 6 extending through the housing structure 3 is radially supported internally in the housing structure by two radial bearings 17, one radial bearing 17 being arranged on each side of the rotor web 18, which rotor web 18 is suitably connected to the motor shaft 6.

On an inner side of the flange coupling 6A, i.e., within the housing structure 3, the motor shaft 6 will be configured with a flange 19, this flange 19 being supported in axial bearing 20 that is arranged in the housing structure 3. One axial bearing 20 will thus be arranged in a bearing housing 31 on either side of the flange 19. One side of the flange 19 and the axial bearing 20 on this side will thus form one of the thrust bearings in the permanent magnet motor 2, whilst the opposite side of the flange 19 and the other axial bearing 20 will thus form the second thrust bearing in the permanent magnet motor 2. The flange 19 is shown as an integral part of the motor shaft 6, but it is also conceivable that the flange 19 may be made as a separate part that is subsequently suitably connected to the motor shaft 6. The flange 19 and the axial bearings 20 will then form a thrust bearing 21 in the permanent magnet motor 2 that is capable of taking up thrust forces axially in both directions. The axial bearings 20 are comprised of thrust discs that are divided into circle segments and arranged following the circular cross-section of the flange 19. A side of the axial bearings 20 facing the flange 19 will then have a sliding material (not shown) applied thereto.

Figure 2:
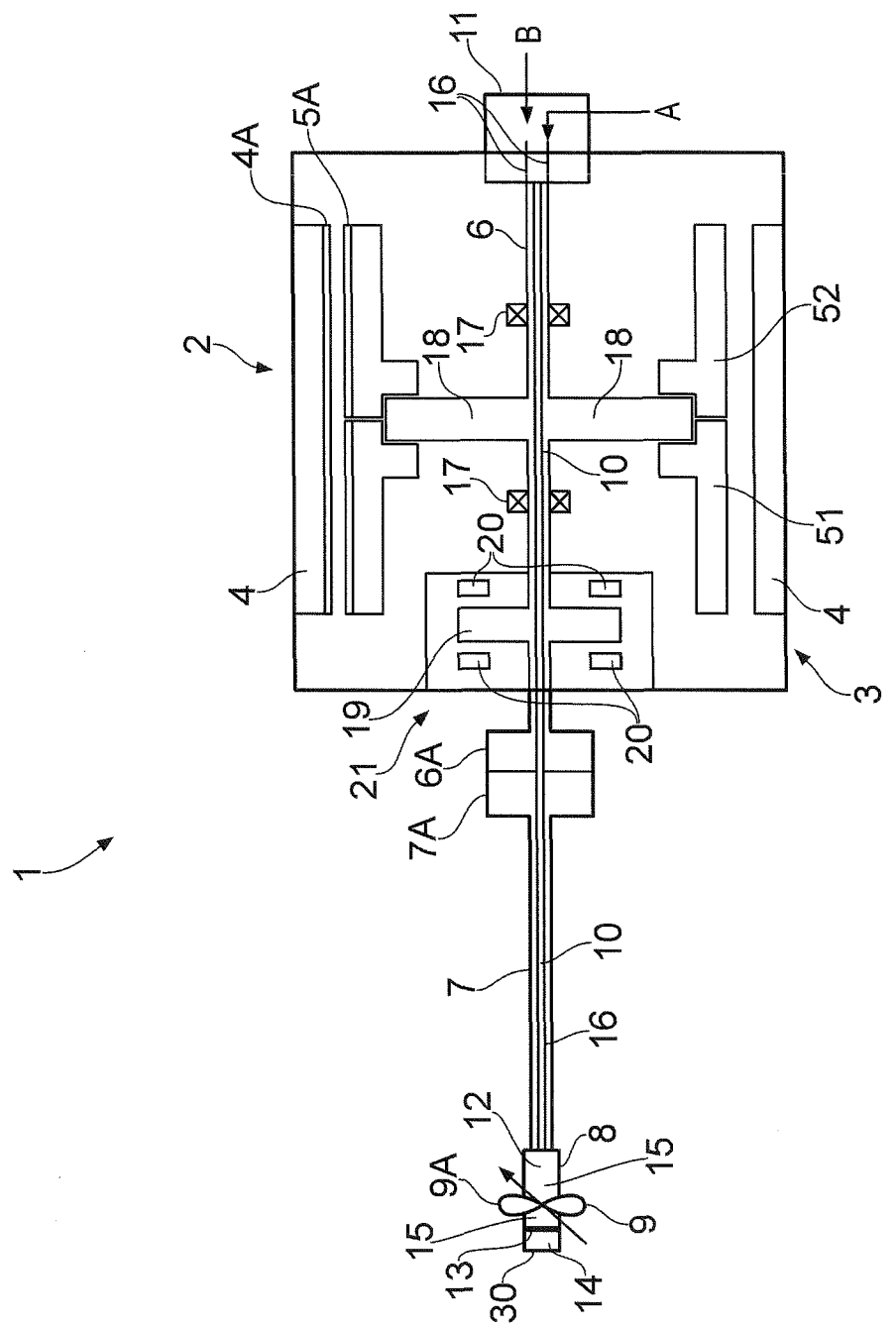
FIG. 2 shows an embodiment of the propulsion system as shown in FIG. 1.

FIG. 2 shows an embodiment of the propulsion system 1 for a vessel in FIG. 1, where the electric permanent magnet motor 2 in this embodiment comprises two rotors 51, 52, each rotor 51, 52 being detachably connected to a common rotor web 18. It should however be understood that each rotor 51, 52 may also be detachably connected to the motor shaft 6 extending through the housing structure. The rotors 51, 52 may be connected to the rotor web 18 through bolts, screws or the like. Alternatively, the rotors 51, 52 may be connected to the rotor web 18 by a clutch connection or the like. Through this arrangement, the propulsion system 1 according to one or more embodiments of the present invention will be capable of being operated, even if a rotor 51, 52 fails or requires maintenance. In that event, the defect rotor 51, 52 or the rotor 51, 52 that is to be maintained can be disconnected from the rotor web 18 or the motor shaft 6, whilst the remaining rotor 52, 51 can be used to drive the propulsion system 1.

The rest of the propulsion system 1 shown in FIG. 2 will be as described in connection with FIG. 1, and therefore this is not repeated here.

Figure 3:
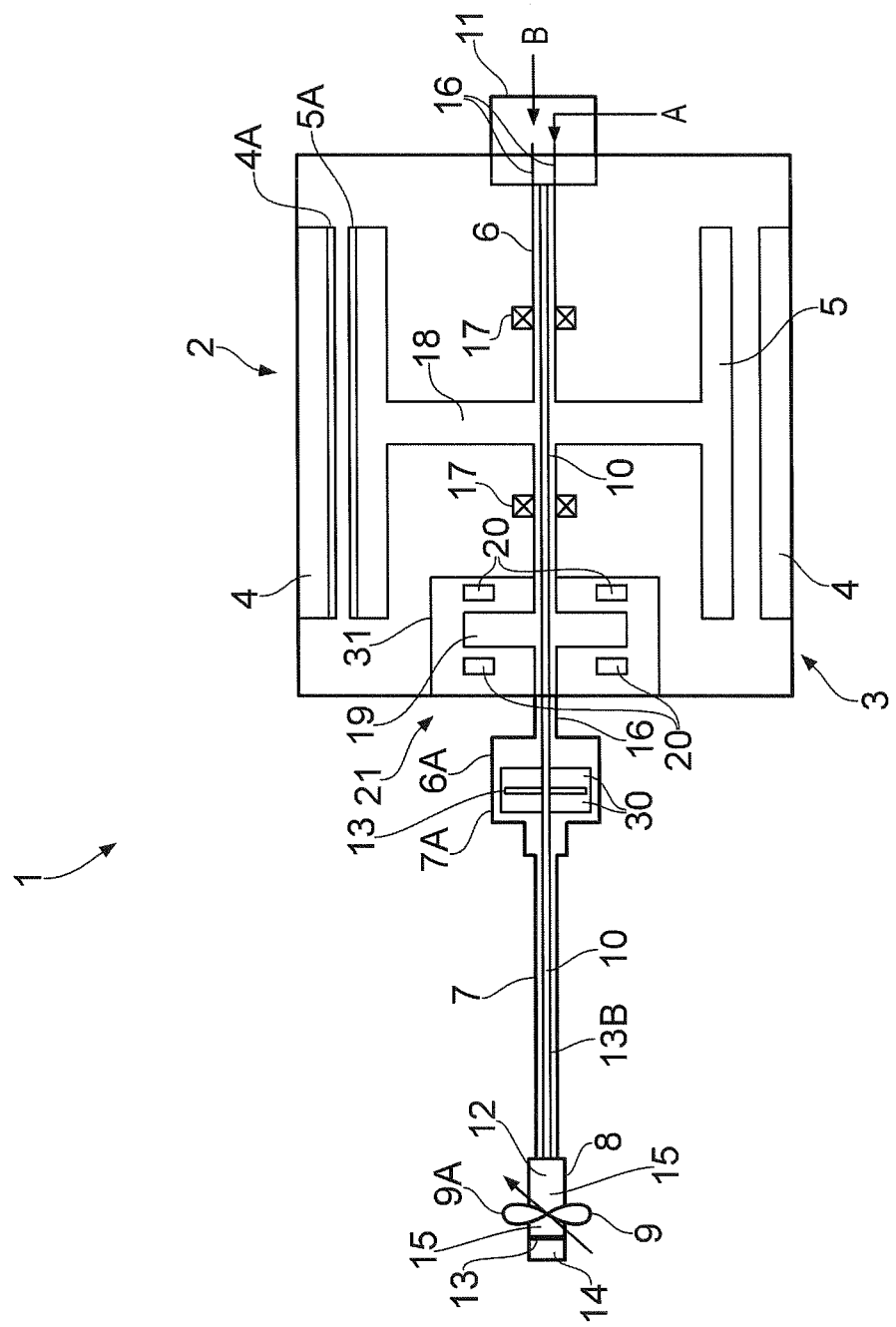
FIG. 3 shows an embodiment of the propulsion system as shown in FIG. 1.

FIG. 3 shows an embodiment of the propeller pitch control system where the flange coupling 6A, 7A is designed to form a closed volume 30, in which closed volume 30 a piston 13 is arranged. A piston rod 13B is further connected to the piston 13 and runs through a bore 10 in the propeller shaft 7 and into the propeller hub 8. In the propeller hub 8, the piston rod 13B is connected to a crank mechanism (not shown), to which crank mechanism the propeller 9 blades 9A are also connected. The oil distributor unit 11 is, via a piping system 16, connected to the piston 13. The structure and function of the piping system 16 will be explained in more detail with reference to FIG. 5.

Since the oil distributor unit 11 is further connected to one or more pump units and a control unit arranged external to the electric permanent magnet motor 2, a fluid will be supplied to the closed volume 30 in the flange coupling 6A, 7A, so as to move the piston 13. As a result of the movement of the piston 13, the piston rod 13B will also be moved in relation to the crank mechanism in the propeller hub 8, which will cause the propeller 9 blades 9A to change their position.

Figure 4:
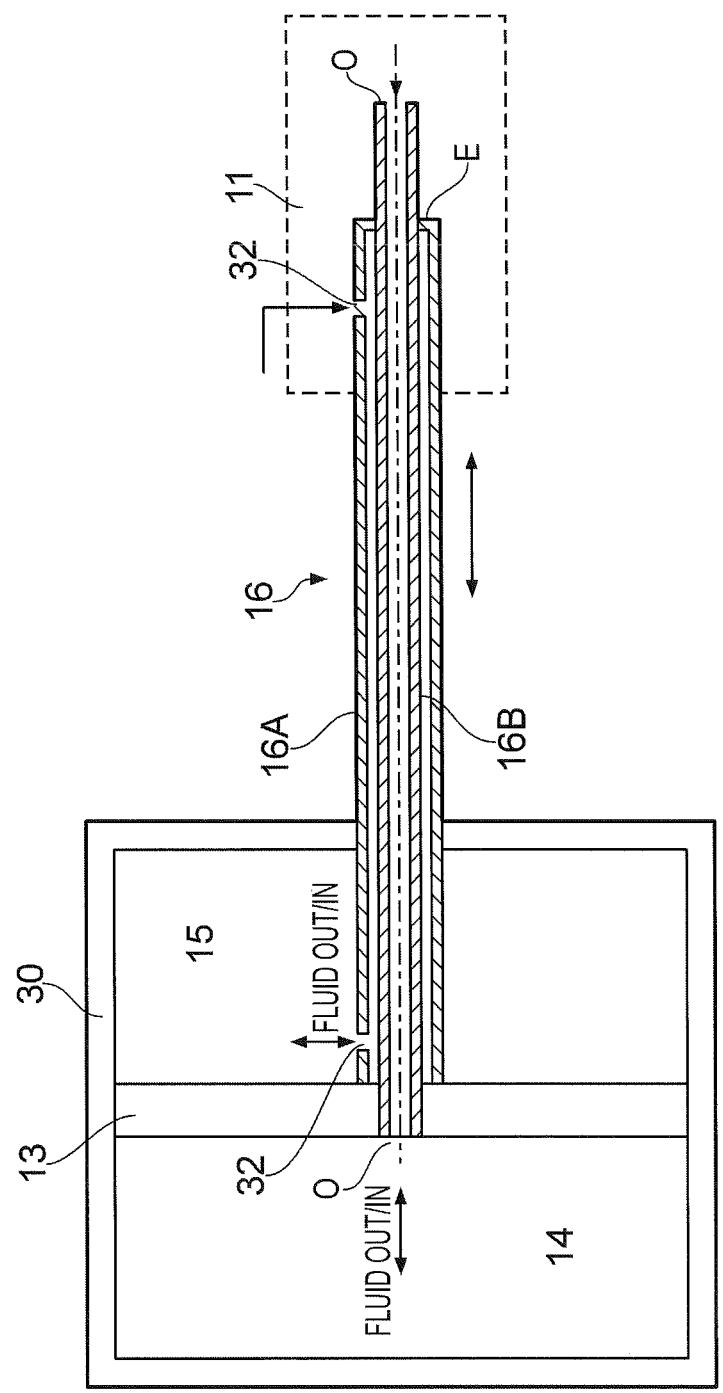
FIG. 4 shows details of a propeller pitch control system in the propulsion system according to FIGS. 1 and 2.

FIG. 4 shows the propeller pitch control system according to FIG. 1 in greater detail, where it can be seen that the oil distributor unit 11 is through the piping system 16 connected to the closed volume 30 in the propeller hub 8, which piping system will be arranged running through the internal bore 10 in the motor shaft 6 and the propeller shaft 7. The piping system 16 will thus be formed of two pipes 16A, 16B, pipe 16B being arranged in pipe 16A. The pipe 16B will moreover have a longer length than pipe 16A, such that the pipe 16B will extend some way out from pipe 16A at both ends. At an end of the piping system 16 that is connected to the oil distributor unit 11, pipe 16A is configured with an end termination E, through which end termination E pipe 16B extends. At an opposite end of the piping system 16, pipe 16B is arranged to run through the piston 13 in the closed volume 30, so as to form fluid communication between the oil distributor unit 11 and a first chamber 14 in the closed volume 30, pipe 16B being configured with open ends O.

The pipe 16A will be configured with at least one opening 32 in proximity to each of its ends and will moreover be fixedly connected in a suitable manner to the piston 13. The one opening 32 in the pipe 16A will then be arranged on an opposite side of the piston 13 through which the pipe 16B runs, in order thereby to form fluid communication between the oil distributor unit 11 and a second chamber 15 in the closed volume 30.

The piston 13 will further be connected to a crank mechanism (not shown) in the propeller hub 8 (see also FIG. 1), the propeller 9 blades 9A also being connected to the crank mechanism.

Since the oil distributor unit 11 is connected to one or more pump units and a control unit (not shown), the first or the second chamber 14, 15 in the closed volume 30 will be capable of being supplied with fluid through the pipe 16A, 16B, in order thereby to move the piston 13 in the closed volume 30. The other pipe 16B, 16A will then be used to "drain" fluid out of the second or the first chamber 15, 14 in the closed volume 30.

The movement of the piston 13 will be transmitted to the crank mechanism, the crank mechanism then changing the position of the propeller blades 9A.

As the piston 13 is connected to the piping system 16, the piping system 16 will follow the movement of the piston 13 and the position of the piping system 16 will thus be capable of being read off at the oil distributor unit 11 through a reading means (not shown), so as to verify the pitch of the propeller blades 9A.

In FIG. 4, for the sake of simplicity, the rest of the propulsion system components are not shown.

Figure 5:
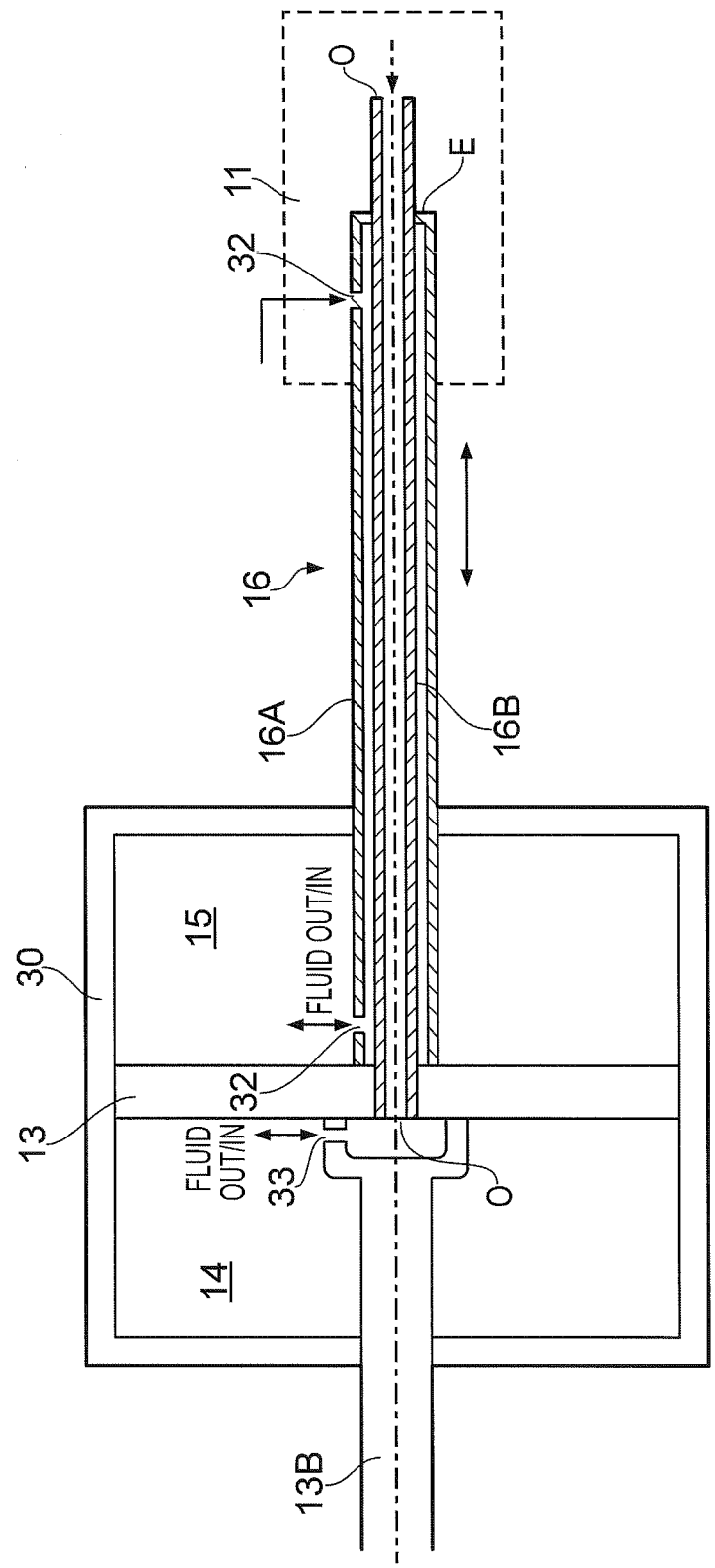
FIG. 5 shows an embodiment of a propeller pitch control system in the propulsion system according to FIGS. 1 and 2.

FIG. 5 shows in greater detail an embodiment of the propeller pitch control system of FIG. 3, where the closed volume 30 is now arranged in the flange or shaft coupling 6A, 7A which is formed between the motor shaft 6 and the propeller shaft 7. Here, the piping system 16 will be configured with and connected to the oil distributor unit 11 and the piston 13 as described above in connection with FIG. 4, and therefore only the differences between embodiments disclosed herein will be described.

At an opposite side of the piston 13 to which the pipe 16A is connected, a piston rod 13B is connected to the piston 13, the piston rod 13B running through the bore 10 in the propeller shaft 7 (see also FIG. 3), so as to be connected to the crank mechanism (not shown) in the propeller hub 8. The piston rod 13B will then be configured with an opening 33, such that fluid communication is formed between the oil distributor unit 11 and the first chamber 14 in the closed volume 30.

Since the oil distributor unit 11 is connected to one or more pump units and a control unit (not shown), the first or the second chamber 14, 15 in the closed volume 30 will be capable of being supplied with fluid through the pipe 16A, 16B, in order thereby to move the piston 13 in the closed volume 30. The other pipe 16B, 16A will then be used to "drain" fluid out of the second or first chamber 15, 14 in the closed volume 30.

In FIG. 5, for the sake of simplicity, the rest of the propulsion system components are not shown.

The movement of the piston 13 will cause the piston rod 13B to also be moved, such that the movement of the piston 13 is transmitted to the crank mechanism, the crank mechanism then changing the position of the propeller blades 9A as described above.

Embodiments of the present invention has now been explained with reference to exemplary embodiments, but a person of skill in the art will appreciate that changes and modifications may be made to these exemplary embodiments that are within the scope of the invention as defined in the following claims.

The invention claimed is:

1. A propulsion system for vessels comprising:
   at least one electric permanent magnet motor, which permanent magnet motor comprises
   a housing structure and
   a stator and rotor arranged therein, the rotor and the stator being separated by an air gap, said at least one electric permanent motor being arranged on board of the vessel,
   a plurality of coils/windings arranged around the inner circumference of the stator and
   a plurality of permanent magnets arranged around the outer circumference of the rotor, the stator being fixedly connected to housing structure and the rotor being connected to a motor shaft extending through housing structure, which motor shaft is through a coupling further connected to a propeller shaft comprising a controllable pitch propeller, wherein a thrust bearing and an oil distributor unit are integrated into the electric permanent magnet motor, the oil distributor unit being in fluid communication with the controllable pitch propeller.

2. A propulsion system according to claim 1, wherein the oil distributor unit is connected to the motor shaft.

3. A propulsion system according to claim 1, wherein the motor shaft and the propeller shaft are configured with an internal bore along the whole length of the motor shaft and the propeller shaft.

4. A propulsion system according to claim 3, wherein the oil distributor unit, through a piping system running through the bore of the motor shaft and the propeller shaft, is connected to a propeller hub.

5. A propulsion system according to claim 4, wherein the propeller hub or flange or shaft coupling comprises a closed volume, which closed volume is divided by a movable piston, thus forming one first and second chamber in the closed volume.

6. A propulsion system according to claim 5, wherein the oil distributor unit is connected via a pipe to the first chamber and is connected via another pipe to the second chamber in the closed volume.

7. A propulsion system according to claim 1, wherein the motor shaft is radially supported through a plurality of radial bearings.

8. A propulsion system according to claim 1, wherein a propeller pitch control system comprises the oil distributor unit and a piping system.

9. A propulsion system according to claim 8, wherein the propeller pitch control system is connected to a control unit and one or more pump units.

10. A propulsion system according to claim 1, wherein the motor shaft at a rear end is configured with a flange, which flange is supported in the thrust bearing.

11. A propulsion system according to claim 10, wherein the flange is an integral part of the motor shaft.

12. A propulsion system according to claim 1, wherein the motor shaft and the propeller shaft are connected through a flange coupling.

13. A propulsion system according to claim 1, wherein the rotor is detachably connected to a rotor web or the motor shaft.

14. A propulsion system according to claim 1, wherein a further rotor is connected to the rotor, which two rotors are detachable from each other and the shaft.

15. A propulsion system according to claim 1, wherein the housing structure comprises two end covers.

* * * * *